(12) United States Patent
Bae

(10) Patent No.: US 9,331,316 B2
(45) Date of Patent: May 3, 2016

(54) BATTERY CELL HOLDER

(71) Applicant: Samsung SDI Co., Ltd., Yongin-si, Gyeonggi-do (KR)

(72) Inventor: Sang-Hoon Bae, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 268 days.

(21) Appl. No.: 13/666,810

(22) Filed: Nov. 1, 2012

(65) Prior Publication Data

US 2013/0202934 A1   Aug. 8, 2013

(30) Foreign Application Priority Data

Feb. 3, 2012   (KR) .................. 10-2012-0011174

(51) Int. Cl.
*H01M 2/10*   (2006.01)

(52) U.S. Cl.
CPC ............ *H01M 2/105* (2013.01); *H01M 2/1061* (2013.01); *H01M 2/10* (2013.01); *H01M 2/1077* (2013.01)

(58) Field of Classification Search
None
See application file for complete search history.

(56) References Cited

U.S. PATENT DOCUMENTS

| 4,265,984 | A  | * | 5/1981 | Kaye | 429/178 |
| 6,743,545 | B2 | * | 6/2004 | Huang | 429/96 |
| 2001/0046624 | A1 | * | 11/2001 | Goto et al. | 429/99 |
| 2005/0170241 | A1 | * | 8/2005 | German et al. | 429/120 |
| 2010/0047676 | A1 | | 2/2010 | Park et al. | |
| 2011/0293985 | A1 | * | 12/2011 | Champion et al. | 429/120 |

FOREIGN PATENT DOCUMENTS

JP    2009-259752 A    11/2009
KR   10-2008-0013040 A   2/2008

* cited by examiner

*Primary Examiner* — Patrick Ryan
*Assistant Examiner* — Carmen Lyles-Irving
(74) *Attorney, Agent, or Firm* — Knobbe, Martens, Olson & Bear, LLP

(57) ABSTRACT

A battery cell holder is disclosed. In one embodiment, the holder includes first and second outer frames respectively positioned at first and second sides of a plurality of battery cells arranged substantially parallel with each other, wherein the first and second sides are opposing each other, and wherein the outer frames comprise first and second outer fastening members, respectively. The cell holder may further include at least one inner frame disposed between the outer frames, wherein the at least one inner frame comprises a first inner frame adjacent to the first outer frame, wherein the first inner frame has first and second inner fastening members which are respectively formed at opposing sides thereof and have corresponding shapes with respect to each other. The first inner fastening member may be connected to the first outer fastening member.

19 Claims, 5 Drawing Sheets

BATTERY CELL HOLDER

RELATED APPLICATIONS

This application claims priority to and the benefit of Korean Patent Application No. 10-2012-0011174, filed on Feb. 3, 2012, in the Korean Intellectual Property Office, the entire content of which is incorporated herein by reference.

BACKGROUND

1. Field

The described technology generally relates to a battery cell holder that contains multiple battery cells, and more particularly, to a standardized cell holder which significantly reduces manufacturing manpower and costs.

2. Description of the Related Technology

As demands on mobile devices increase with the development of associated and supporting technologies, demands on battery cells have rapidly increased as an energy source.

Battery cells are generally used by connecting together multiple battery cells, where the number of cells depends on the type of external device.

For example, smaller-sized devices such as a cellular phone can often operate with the power and capacity of a single cell over a given period of time. On the other hand, medium- or large-sized devices such as a notebook computer, electric-powered tool, hybrid or electric vehicle generally require multiple cells to increase battery power and capacity.

SUMMARY

One inventive aspect is a standardized cell holder which can hold different numbers of battery cells, thereby remarkably reducing manufacturing manpower and costs.

Another aspect is a cell holder including: a pair of outer frames respectively positioned at both sides of a plurality of battery cells arranged in parallel; and at least one inner frame disposed between the pair of outer frames, and having fastening members respectively formed at one and the other sides thereof, wherein any one of the inner frames is fastened to the fastening member of the outer frame adjacent the one inner frame through the fastening member formed at the one side of the one inner frame, and the shape of the fastening member formed at the other side of the one inner frame corresponds to that of the fastening member formed at the one side of the one inner frame.

The shape of the fastening member formed at the other side of the one inner frame may be identical to that of the fastening member of the outer frame adjacent to the one inner frame.

The fastening member of the outer frame adjacent to the one inner frame may be a latch groove, and the fastening member formed at the one side of the one inner frame may be a hook inserted and fastened to the latching groove.

The fastening member formed at one side of the one inner frame may be a latching groove, and the fastening member adjacent to the one inner frame may be a hook inserted and fastened to the latching groove.

The battery cell may have a cylindrical or prismatic shape.

A first connecting rod coupled to a separate outer frame may be formed at one side of the outer frame.

The outer frame may be further formed with a first connection groove into which a first connection rod formed in the separate outer frame is inserted.

A second connection rod coupled to the separate inner frame may be formed at one side of the inner frame.

The inner frame may further include a mounting part in which battery cells in at least one column are positioned.

Another aspect is a battery cell holder comprising: first and second outer frames respectively positioned at first and second sides of a plurality of battery cells arranged substantially parallel with each other, wherein the first and second sides are opposing each other, and wherein the outer frames comprise first and second outer fastening members, respectively; and at least one inner frame disposed between the outer frames, wherein the at least one inner frame comprises a first inner frame adjacent to the first outer frame, wherein the first inner frame has first and second inner fastening members which are respectively formed at opposing sides thereof and have corresponding shapes with respect to each other, and wherein the first inner fastening member is connected to the first outer fastening member.

In the above cell holder, the shape of the first outer fastening member is substantially identical to that of the second inner fastening member. In the above cell holder, one of the first inner fastening member and the first outer fastening member is a latching groove, and wherein the other fastening member is a hook that is inserted and fastened to the latching groove. In the above cell holder, the at least one inner frame further comprises a second inner frame adjacent to the second outer frame, wherein the second inner frame has first and second inner fastening members which are respectively formed at opposing sides thereof and have corresponding shapes with respect to each other, and wherein the second inner fastening member of the second inner frame is connected to the second outer fastening member. In the above cell holder, one of the second inner fastening member and the second outer fastening member is a latching groove, and wherein the other fastening member is a hook that is inserted and fastened to the latching groove.

In the above cell holder, each of the battery cells has a cylindrical or prismatic shape. The above cell holder further comprises: an additional outer frame; and a first connecting rod formed on at least one side of each of the outer frames and coupled to the additional outer frame. In the above cell holder, the additional outer frame has a first connection rod, and wherein the outer frame has a first connection groove into which the first connection rod is inserted. The above cell holder further comprises: an additional inner frame; and a second connection rod formed on at least one side of the inner frame and coupled to the additional inner frame. In the above cell holder, the inner frame further comprises a mounting part in which battery cells in at least one column are positioned. In the above cell holder, the mounting part is configured to substantially completely surround at least a portion of the battery cells. In the above cell holder, the inner and outer frames are configured to receive and hold the battery cells. In the above cell holder, the battery cells are arranged in M rows and N columns, and wherein the inner and outer frames are configured to receive and hold K battery cells to satisfy the equation of M×N=K.

Another aspect is a battery cell holder comprising: first and second outer frames spaced apart and comprising first and second outer fastening members, respectively; and a plurality of inner frames disposed between the outer frames, wherein the inner frames comprise a first inner frame adjacent to the first outer frame, wherein the first inner frame has first and second inner fastening members which are respectively formed at opposing sides thereof and have corresponding shapes with respect to each other, and wherein the first inner fastening member is connected to the first outer fastening member, wherein the inner and outer frames are configured to receive and hold a plurality of battery cells.

In the above cell holder, the shape of the first outer fastening member is substantially identical to that of the second inner fastening member. In the above cell holder, one of the first inner fastening member and the first outer fastening member is a latching groove, and wherein the other fastening member is a hook that is inserted and fastened to the latching groove. In the above cell holder, the inner frames further comprise a second inner frame adjacent to the second outer frame, wherein the second inner frame has first and second inner fastening members which are respectively formed at opposing sides thereof and have corresponding shapes with respect to each other, wherein the second inner fastening member of the second inner frame is connected to the second outer fastening member. In the above cell holder, the inner frames further comprise at least one third inner frame interposed between and connected to the first and second inner frames.

Another aspect is a battery cell system comprising: a plurality of battery cells arranged in substantially parallel with each other; first and second outer frames respectively positioned at first and second sides of the battery cells, wherein the first and second sides are opposing each other, and wherein the outer frames have first and second outer fastening members, respectively; and at least one inner frame disposed between the outer frames, wherein the at least one inner frame comprises a first inner frame adjacent to the first outer frame, wherein the first inner frame has first and second inner fastening members which are respectively formed at opposing sides thereof and have corresponding shapes with respect to each other, and wherein the first inner fastening member is connected to the first outer fastening member, wherein the inner and outer frames are configured to receive and hold the battery cells.

In the above system, one of the first inner fastening member and the first outer fastening member is a latching groove, and wherein the other fastening member is a hook that is inserted and fastened to the latching groove.

DETAILED DESCRIPTION

Figure 1:
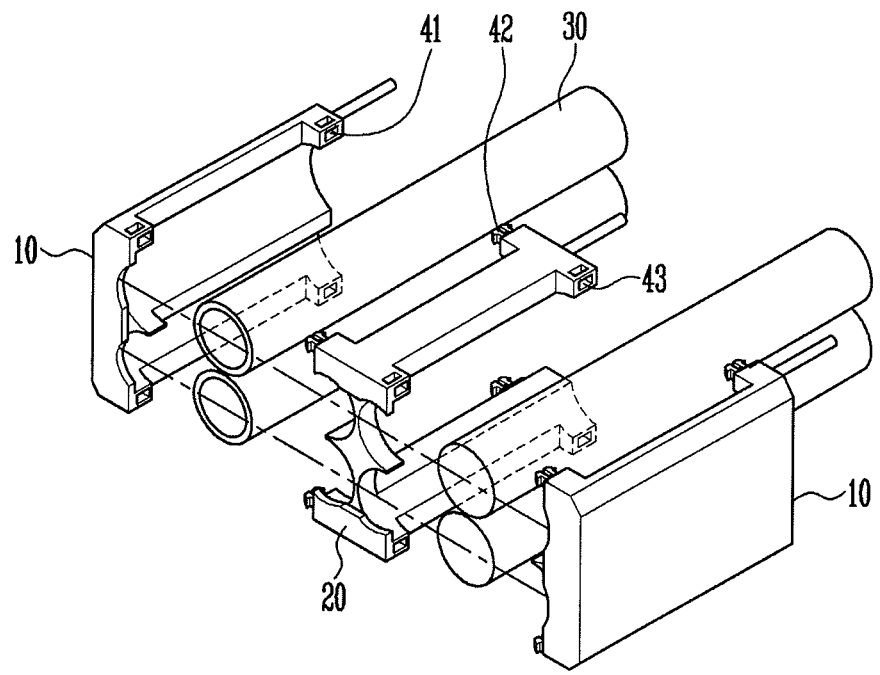
FIG. 1 is an exploded perspective view of a cell holder according to an embodiment.

A battery cell holder is generally integrally manufactured with battery cells and thus can only hold a fixed number of batteries. Thus, when the number of battery cells is changed, a new cell holder is required, resulting in increased manufacturing costs.

Hereinafter, embodiments will be described in detail with reference to the accompanying drawings. In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 2:
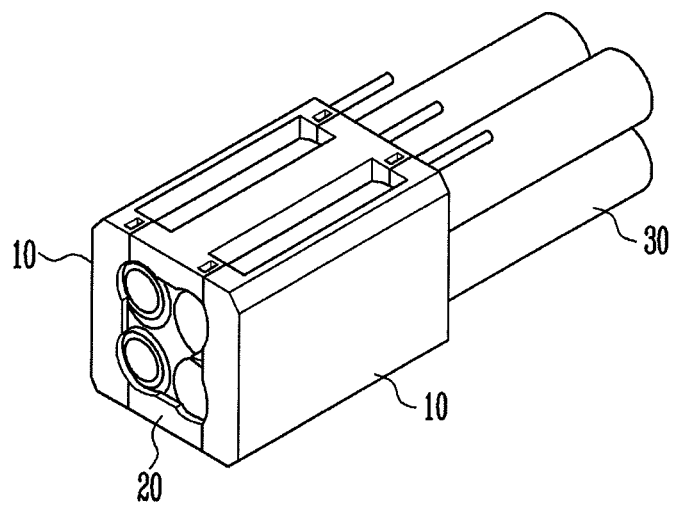
FIG. 2 is a perspective view showing an assembled state of the cell holder shown in FIG. 1.

FIG. 1 is an exploded perspective view of a cell holder according to an embodiment. FIG. 2 is a perspective view showing an assembled state of the cell holder shown in FIG. 1.

Referring to FIGS. 1 and 2, the cell holder includes a pair of outer frames 10 and an inner frame 20.

The outer frames 10 are respectively positioned at both sides of a plurality of battery cells 30 arranged in substantially parallel with each other. That is, the outer frames 10 may be respectively mounded on the outermost ones of the battery cells 30.

Each of the outer frames 10 includes a fastening member 41 formed at the inside thereof, so that the outer frames 10 can be fastened to the inner frame 20 positioned therebetween.

The inner frame 20 may include one or more inner frames. The number of the inner frames may be varied depending on the number of required battery cells 30.

In one embodiment, the inner frame 20 is positioned between columns of the battery cells 30 so as to distinguish one column from another column.

In FIGS. 1 and 2, a case in which four battery cells 30 exists in the form of two rows and two columns has been illustrated as an example, and therefore, one inner frame 20 may be used.

In this case, the inner frame 20 has fastening members 42 formed at one side thereof and fastening members 43 formed at the opposite side (the other side) thereof, so as to be fastened to the outer frame 10 and/or another inner frame 20.

The shape of the fastening member 42 formed at one side of the inner frame 20 may correspond to that of the fastening member 43 formed at the other side of the inner frame 20.

Figure 6:
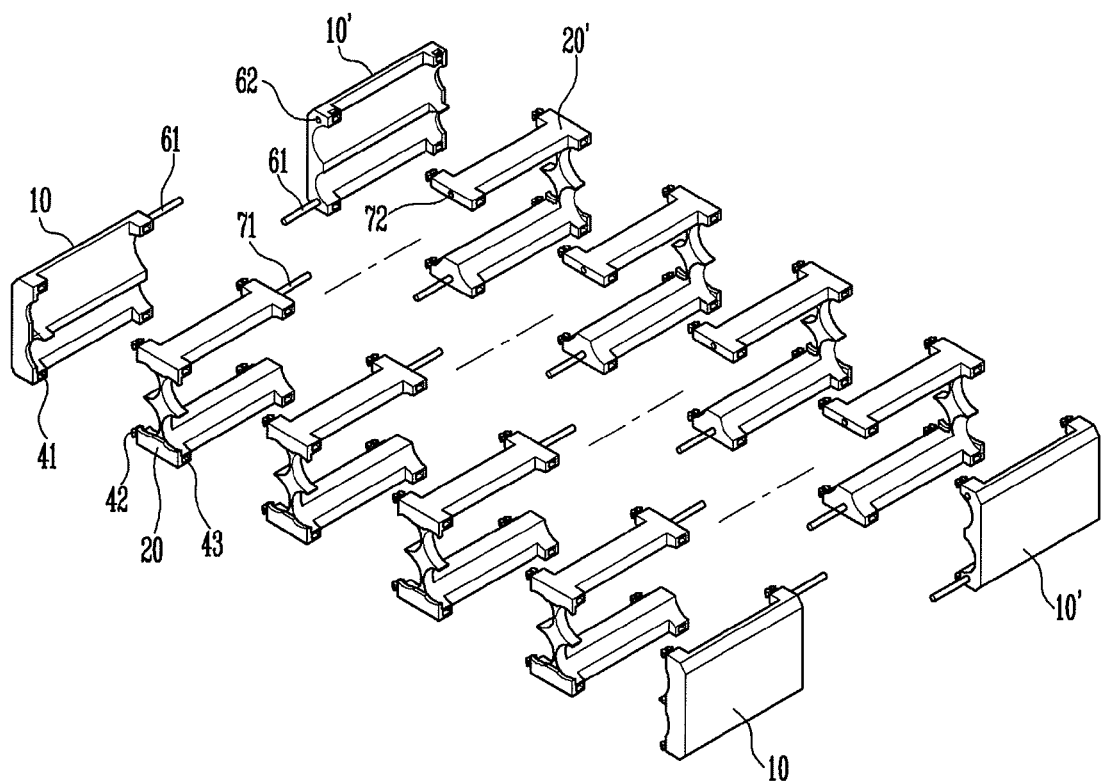
FIG. 6 is an exploded perspective view of a cell holder according to still another embodiment.

In one embodiment, as shown in FIG. 6, more than two columns of battery cells 30 and more than two inner frames 20 are provided. In this embodiment, the fastening members 42 and 43 may be connected to the fastening members of adjacent inner frames in order to accommodate different numbers of battery cells.

In the embodiment of FIGS. 1 and 2, only one inner frame 20 is shown, and therefore, both of the outer frames 10 are connected to the inner frame 20 positioned therebetween.

In this embodiment, the inner frame 20 is directly connected to the outer frames 10 via the fastening members 41. In another embodiment where there are two or more inner frames as provided as shown in FIG. 6, inner frames can be connected to adjacent inner frames or the outer frames 10.

Figure 3:
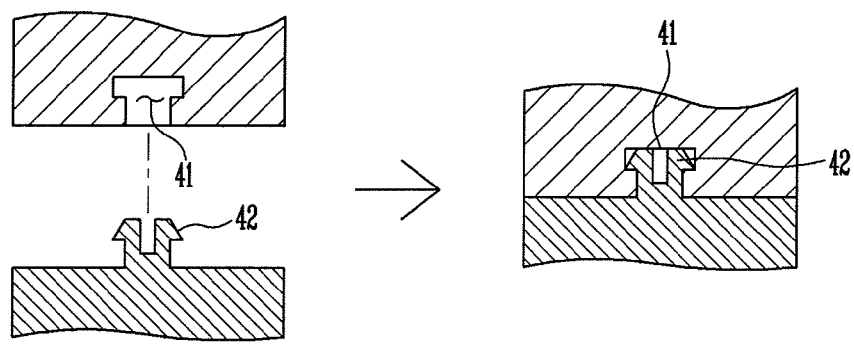
FIG. 3 is a view showing structures of coupling parts and a coupling method of the coupling parts shown in FIG. 1.

FIG. 3 is a view showing structures of coupling parts and a coupling method of the coupling parts shown in FIG. 1.

The fastening member 41 of the outer frame 10 may be a latching groove, and the counterpart fastening member 42 of the inner frame 20 may be a hook having a protruding shape.

In one embodiment, the hook is inserted into the latching groove, and then latched to a prominence formed in the latching groove, so that it is possible to prevent the fastening member 42 from coming off from the fastening member 41.

In another embodiment, the fastening member 41 of the outer frame 10 is a hook, and the counterpart fastening member 42 of the inner frame 20 is a latching groove.

In one embodiment, the shape of the fastening member 42 at one side of the inner frame 20 corresponds to that of the fastening member 43 at the other side of the inner frame 20. In another embodiment, the shape of the fastening member 43 at the other side of the inner frame 20 is substantially identical to that of the fastening member 41 of the outer frame 10 fastened to the inner frame 20.

For example, when the fastening member 41 of the outer frame 10 is formed as a latching groove, the fastening member 43 of the inner frame 20 is also formed as substantially the same latching groove. When the fastening member 41 of the outer frame 10 is formed as a hook, the fastening member 43 of the inner frame 20 may also be formed as substantially the same hook.

The battery cells 30 function to supply power to an electronic device such as an electric-powered tool.

The number of the battery cells 30 may be varied depending on an electronic device requiring power.

Although it has been illustrated in FIGS. 1 and 2 that the shape of the battery cell 30 is a cylindrical shape, it will be apparent that the shape of the battery cell 30 may be another shape such as a prismatic shape.

The battery cell 30 may be a secondary battery such as a nickel-cadmium battery, a nickel metal hydride battery, a lithium ion battery or a lithium polymer battery. However, the battery cell 30 may be a primary battery.

In this embodiment, the battery cells 30 may be arranged to form at least one row or column. The columns may be divided by the inner frames 20 positioned therebetween.

Figure 4:
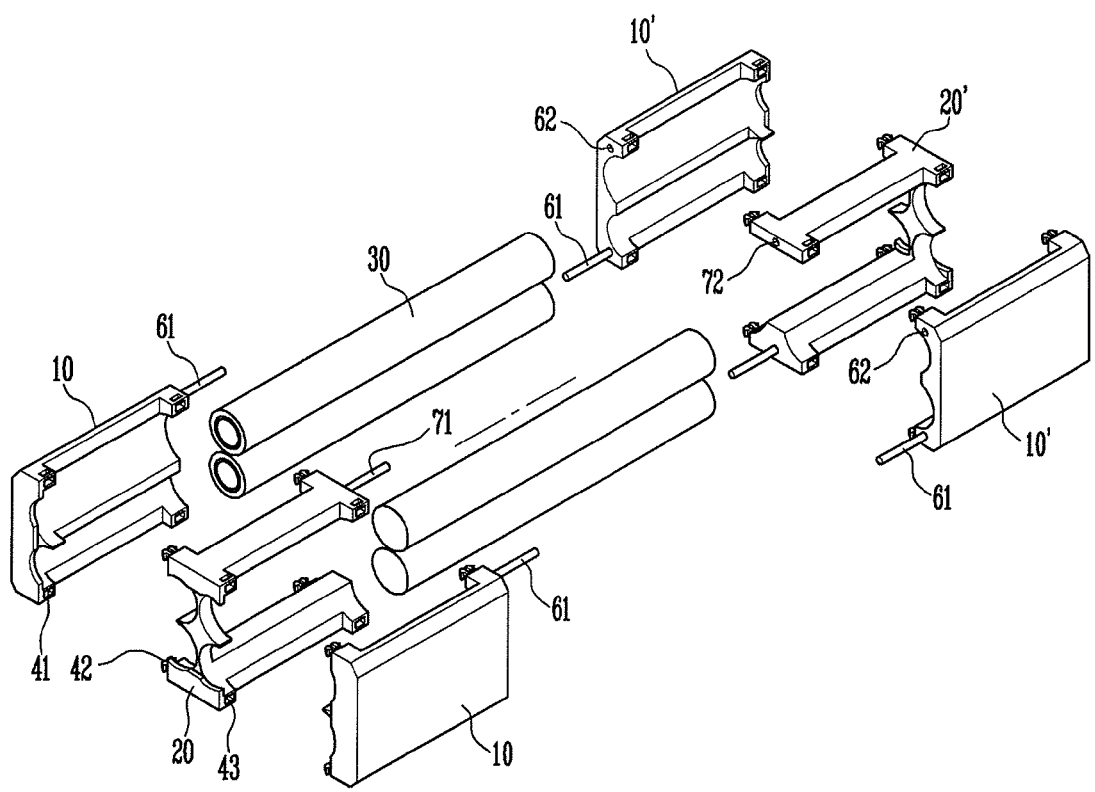
FIG. 4 is an exploded perspective view of a cell holder according to another embodiment.
Figure 5:
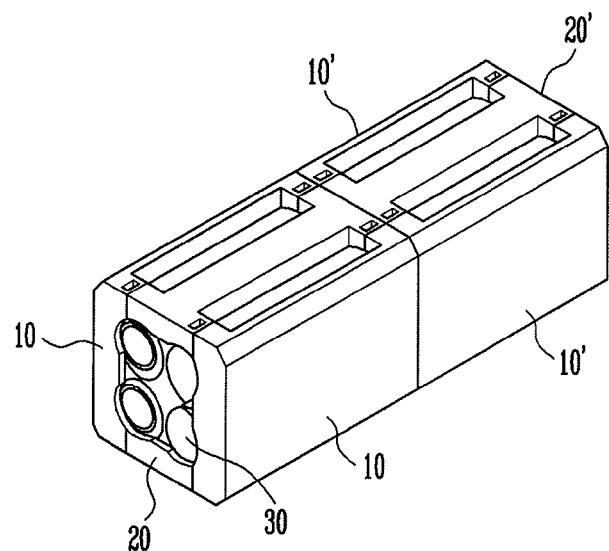
FIG. 5 is a perspective view showing an assembled state of the cell holder shown in FIG. 4.

FIG. 4 is an exploded perspective view of a cell holder according to another embodiment. FIG. 5 is a perspective view showing an assembled state of the cell holder shown in FIG. 4.

Referring to FIGS. 4 and 5, an outer frame 10 of the cell holder according to this embodiment has a first connection rod 61 formed at one side thereof so as to be coupled to a separate outer frame (or an additional outer frame) 10' through the first connection rod 61.

A first connection groove 62 is formed in the separate outer frame 10' so that the first connection rod 61 can be inserted and coupled thereto.

Thus, the outer frame 10 can be coupled to the separate outer frame 10' positioned at one side thereof, and accordingly, the battery cells 30 in the cell holder can be more firmly fixed. In another embodiment, two sides of the outer frame 10 can be coupled to two additional outer frame 10', respectively.

In one embodiment, a first connection groove 62 coupled to a first connection rod 61 formed at the separate outer frame 10' is further formed in the outer frame 10 so that the coupling between the outer frame 10 and the separate outer frame 10' can be more stably implemented.

In one embodiment, a second connection rod 71 through which an inner frame 20 is coupled to a separate inner frame (or an additional inner frame) 20' is also formed at one side of the inner frame 20. In another embodiment, two sides of the inner frame 20 can be coupled to two additional inner frame 20', respectively.

In this case, the second connection rod 71 of the inner frame 20 may be inserted and coupled to a second connection groove 72 formed in the separate inner frame 20'.

Accordingly, as shown in FIG. 5, the outer frame 10 and the inner frame 20 can be respectively coupled to the separate outer frame 10' and the separate inner frame 20' in the state in which the battery cells 30 are fixed in the cell holder.

As shown in FIG. 4, the separate outer frame 10' and the separate inner frame 20' are substantially identical to the outer frame 10 and the inner frame 20, respectively. The separate outer frame 10' and the separate inner frame 20' may be implemented by changing the directions of the outer frame 10 and the inner frames, respectively.

Figure 7:
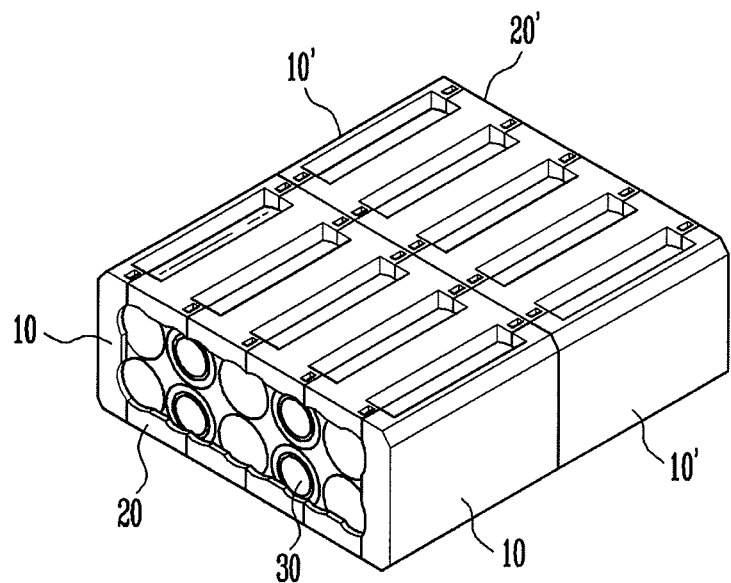
FIG. 7 is a perspective view showing an assembled state of the cell holder shown in FIG. 6.

FIG. 6 is an exploded perspective view of a cell holder according to still another embodiment. FIG. 7 is a perspective view showing an assembled state of the cell holder shown in FIG. 6.

In the embodiment of FIGS. 6 and 7, a plurality of inner frames 20 are used. For example, four inner frames 20 are illustrated in FIGS. 6 and 7. Descriptions identical to those of the aforementioned embodiments will be omitted.

In one embodiment, when the number of battery cells 30 required for an electronic device is K, the battery cells 30 may be arranged in M rows and N columns to satisfy the equation of M×N=K. For example, when the number of battery cells 30 is 10, the battery cells 30 may be arranged in two rows and five columns, or five rows or two columns.

Accordingly, the inner frames 20 may be positioned between the respective columns of the battery cells, and thus four inner frames 40 can be used.

Like the aforementioned embodiments, each of the pair of outer frames 10 respectively positioned at both sides of the battery cells 30 may be fastened to the inner frame 20 adjacent thereto. That is, a fastening member 41 of each of the outer frames 10 may be fastened to a fastening member 42 at one side of the inner frame 20 adjacent to the outer frame 10.

The inner frame 20 fastened to the outer frame 10 may be fastened to another inner frame 20 through a fastening member 43 formed at the other side thereof.

Accordingly, the pair of outer frames 10 and the four inner frames 20 are coupled to each other through their fastening members 41, 42 and 43 as shown in FIG. 7, so that the battery cells 30 positioned in the cell holder can be fixed.

Although it has been illustrated in these figures that two battery cells 30 are positioned between the inner and outer frames 20 and 10, this is merely an embodiment, and it will be apparent that different numbers of battery cells 30 may be positioned between the inner and outer frames 20 and 10.

Figure 8A:
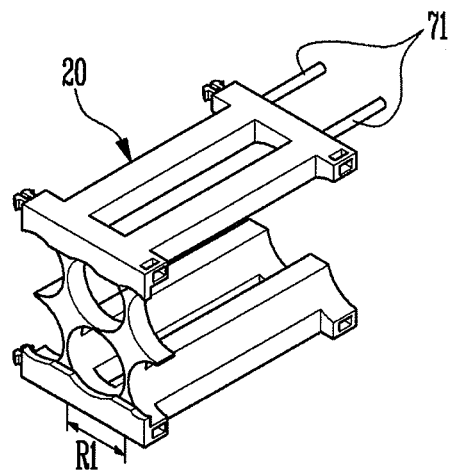
FIGS. 8A and 8B are perspective views showing embodiments of an inner frame.
Figure 8B:
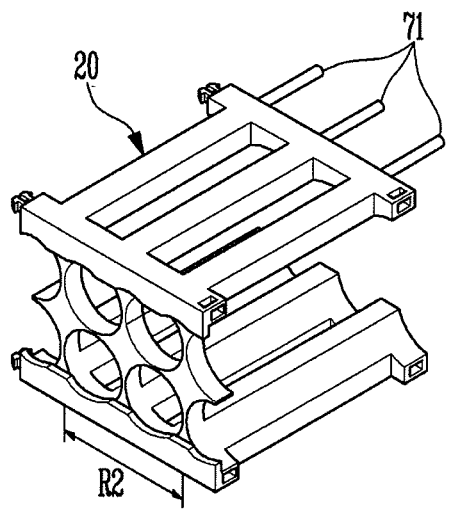

FIGS. 8A and 8B are perspective views showing embodiments of an inner frame.

Referring to FIGS. 8A and 8B, the inner frame 20 may be formed to have a mounting part R1 or R2 on which battery cells 30 in at least one column are positioned.

FIG. 8A shows a case in which a mounting part R1 is formed so that battery cells 30 in one column can be positioned. FIG. 8B shows a case in which a mounting part R2 is formed so that battery cells 30 in two columns can be positioned.

When the mounting part R1 or R2 is formed so that the battery cells 30 can be positioned in the inner frame 20, the number of the inner frames 20 can be decreased, and accordingly, it is possible to reduce assembling and working tolerances that may occur in the assembling of the cell holder.

That is, the inner frame 20 in which the mounting part R1 of FIG. 8A is formed can be substituted for two inner frames 20 in which the mounting part R1 is not formed, and the inner frame 20 in which the mounting part R2 of FIG. 8B is formed can be substituted for three inner frames 20 in which the mounting part R2 is not formed.

According to at least one of the disclosed embodiments, only the number of the inner frames is changed according to the number of required battery cells while the pair of outer frames are maintained so that the standardized cell holder can easily accommodate varying numbers of battery cells, significantly reducing manufacturing man power and costs.

While the above embodiments have been described in connection with the accompanying drawings, it is to be understood that the present disclosure is not limited to the disclosed embodiments, but, on the contrary, is intended to cover various modifications and equivalent arrangements included within the spirit and scope of the appended claims, and equivalents thereof.

What is claimed is:

1. A battery cell holder comprising:
   first and second outer frames respectively comprising first and second outer fastening members; and
   at least one inner frame placed between the first and second outer frames, wherein the at least one inner frame comprises a first inner frame adjacent to the first outer frame, wherein the first inner frame comprises first and second inner fastening members opposing each other, wherein the first inner fastening member is configured to be connected to the first outer fastening member such that the first inner frame and the first outer frame receive and hold a first group of battery cells,
   wherein the second inner fastening member is configured to be connected to the second outer frame or an adjacent inner frame such that i) the first inner frame and ii) the second outer frame or the adjacent inner frame receive and hold a second group of battery cells different from the first group of battery cells,
   wherein the first inner frame includes i) a battery cell accommodating portion having a curved shape conforming to the shape of the outer surface of each of the battery cells and configured to accommodate part of each of the first and second groups of battery cells and ii) a pair of coupling portions formed on opposing ends of the battery cell accommodating portion, wherein each of the coupling portions includes a body extending perpendicularly to the battery cell accommodating portion, and first and second ends formed on opposing ends of the body and perpendicular to the body, wherein the first inner fastening member is formed on each of the first and second ends of the coupling portions so as to face the first outer frame, wherein the second inner fastening member is formed on each of the first and second ends of the coupling portions so as to face the second outer frame and wherein the body is narrower than the first and second ends of each coupling portion.

2. The cell holder according to claim 1, wherein the shape of the first outer fastening member is identical to that of the second inner fastening member.

3. The cell holder according to claim 1, wherein one of the first inner fastening member and the first outer fastening member is a latching groove, and wherein the other of the first inner fastening member and the first outer fastening member is a hook that is configured to be inserted and fastened to the latching groove.

4. The cell holder according to claim 1, wherein the at least one inner frame further comprises a second inner frame adjacent to the second outer frame, wherein the second inner frame comprises first and second sides opposing each other and respectively including first and second inner fastening members, and wherein the second inner fastening member of the second inner frame is configured to be connected to the second outer fastening member.

5. The cell holder according to claim 4, wherein one of the second inner fastening member and the second outer fastening member is a latching groove, and wherein the other of the second inner fastening member and the second outer fastening member is a hook that is configured to be inserted and fastened to the latching groove.

6. The cell holder according to claim 1, wherein each of the battery cells has a cylindrical or prismatic shape.

7. The cell holder according to claim 1, further comprising:
   an additional outer frame; and
   a first connecting rod formed on at least one side of each of the outer frames and coupled to the additional outer frame.

8. The cell holder according to claim 7, wherein the additional outer frame has a first connection rod, and wherein the outer frame has a first connection groove into which the first connection rod is inserted.

9. The cell holder according to claim 8, further comprising:
   a second connection rod formed on at least one side of the inner frame and coupled to the adjacent inner frame.

10. The cell holder according to claim 1, wherein the inner frame further comprises a mounting part in which battery cells in at least one column are positioned.

11. The cell holder according to claim 10, wherein the mounting part is configured to surround at least a portion of the battery cells.

12. The cell holder according to claim 1, wherein the battery cells are arranged in M rows and N columns, and wherein the inner and outer frames are configured to receive and hold K battery cells to satisfy the equation of M×N=K.

13. A battery cell holder comprising:
   first and second outer frames spaced apart and comprising first and second outer fastening members, respectively; and
   a plurality of inner frames placed between the first and second outer frames, wherein the inner frames comprise a first inner frame adjacent to the first outer frame, wherein the first inner frame comprises first and second inner fastening members opposing each other,
   wherein the first inner fastening member is configured to be connected to the first outer fastening member such that the first inner frame and the first outer frame receive and hold a first group of battery cells,
   wherein the second inner fastening member is configured to be connected to the second outer frame or an adjacent inner frame such that i) the first inner frame and ii) the second outer frame or the adjacent inner frame receive and hold a second group of battery cells different from the first group of battery cells,
   wherein the first inner frame includes i) a battery cell accommodating portion having a curved shape conforming to the shape of the outer surface of each of the battery cells and configured to accommodate part of each of the first and second groups of battery cells and ii) a pair of coupling portions formed on opposing ends of the battery cell accommodating portion, wherein each of the coupling portions includes a body extending perpendicularly to the battery cell accommodating portion, and first and second ends formed on opposing ends of the body and perpendicular to the body, wherein the first inner fastening member is formed on each of the first and second ends of the coupling portions so as to face the first outer frame, wherein the second inner fastening member is formed on each of the first and second ends of the coupling portions so as to face the second outer frame, and wherein the body is narrower than the first and second ends of each coupling portion.

14. The cell holder according to claim 13, wherein the shape of the first outer fastening member is identical to that of the second inner fastening member.

15. The cell holder according to claim 13, wherein one of the first inner fastening member and the first outer fastening member is a latching groove, and wherein the other of the first inner fastening member and the first outer fastening member is a hook that is configured to be inserted and fastened to the latching groove.

16. The cell holder according to claim 13, wherein the inner frames further comprise a second inner frame adjacent to the second outer frame, wherein the second inner frame comprises first and second sides opposing each other and respectively including first and second inner fastening members, and wherein the second inner fastening member of the second inner frame is configured to be connected to the second outer fastening member.

17. The cell holder according to claim 16, wherein the inner frames further comprise at least one third inner frame interposed between and connected to the first and second inner frames.

18. A battery cell system comprising:
a plurality of battery cells comprising a first group of battery cells and a second group of battery cells different from the first group of battery cells;
first and second outer frames respectively comprising first and second outer fastening members; and
at least one inner frame placed between the first and second outer frames, wherein the at least one inner frame comprises a first inner frame adjacent to the first outer frame, wherein the first inner frame comprises first and second inner fastening members opposing each other,
wherein the first inner fastening member is configured to be connected to the first outer fastening member such that the first inner frame and the first outer frame receive and hold the first group of battery cells,
wherein the second inner fastening member is configured to be connected to the second outer frame or an adjacent inner frame such that i) the first inner frame and ii) the second outer frame or the adjacent inner frame receive and hold the second group of battery cells,
wherein the first inner frame includes i) a battery cell accommodating portion having a curved shape conforming to the shape of the outer surface of each of the battery cells and configured to accommodate part of each of the first and second groups of battery cells and ii) a pair of coupling portions formed on opposing ends of the battery cell accommodating portion, wherein each of the coupling portions includes a body extending perpendicularly to the battery cell accommodating portion, and first and second ends formed on opposing ends of the body and perpendicular to the body, wherein the first inner fastening member is formed on each of the first and second ends of the coupling portions so as to face the first outer frame, wherein the second inner fastening member is formed on each of the first and second ends of the coupling portions so as to face the second outer frame, and wherein the body is narrower than the first and second ends of each coupling portion.

19. The system according to claim 18, wherein one of the first inner fastening member and the first outer fastening member is a latching groove, and wherein the other of the first inner fastening member and the first outer fastening member is a hook that is configured to be inserted and fastened to the latching groove.

* * * * *